Jan. 19, 1937.  F. T. JOHNSON  2,068,492
ANIMAL TRAP
Filed April 22, 1935  2 Sheets-Sheet 1
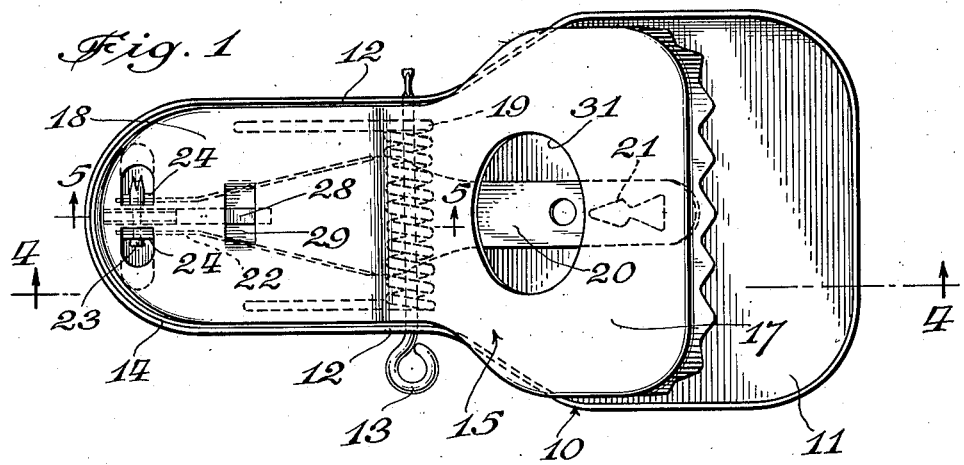
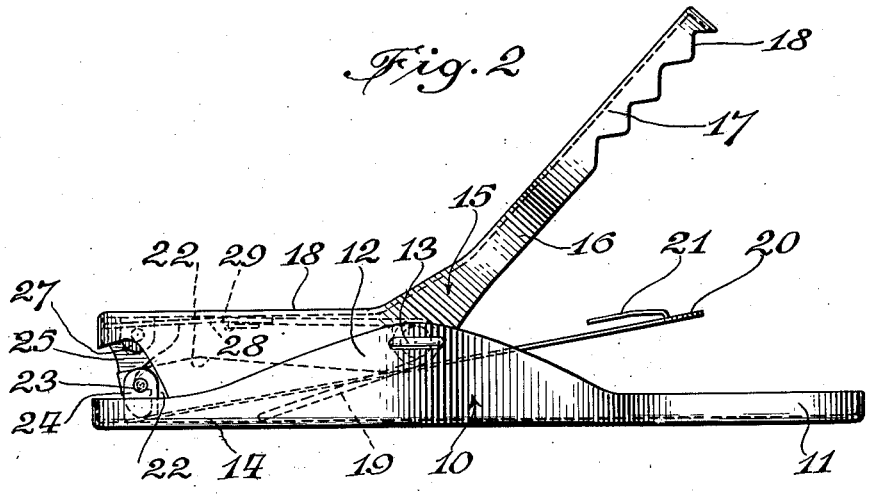
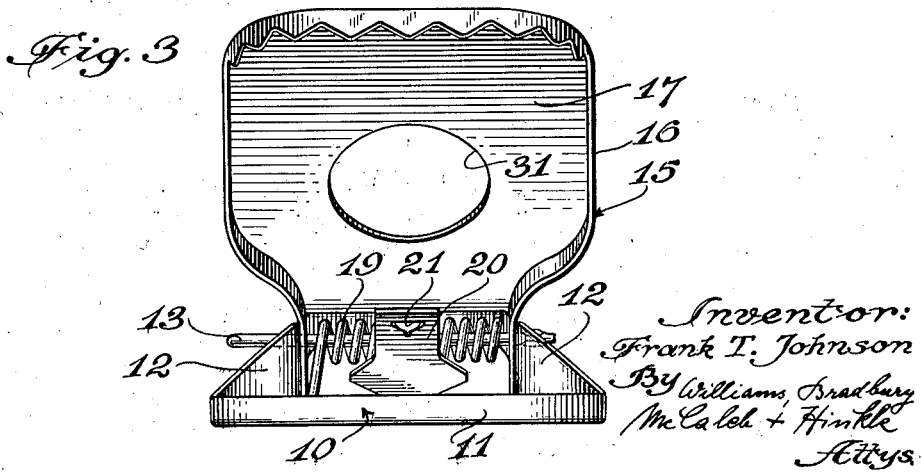
Inventor:
Frank T. Johnson
By Williams, Bradbury
McCaleb & Hinkle
Attys.

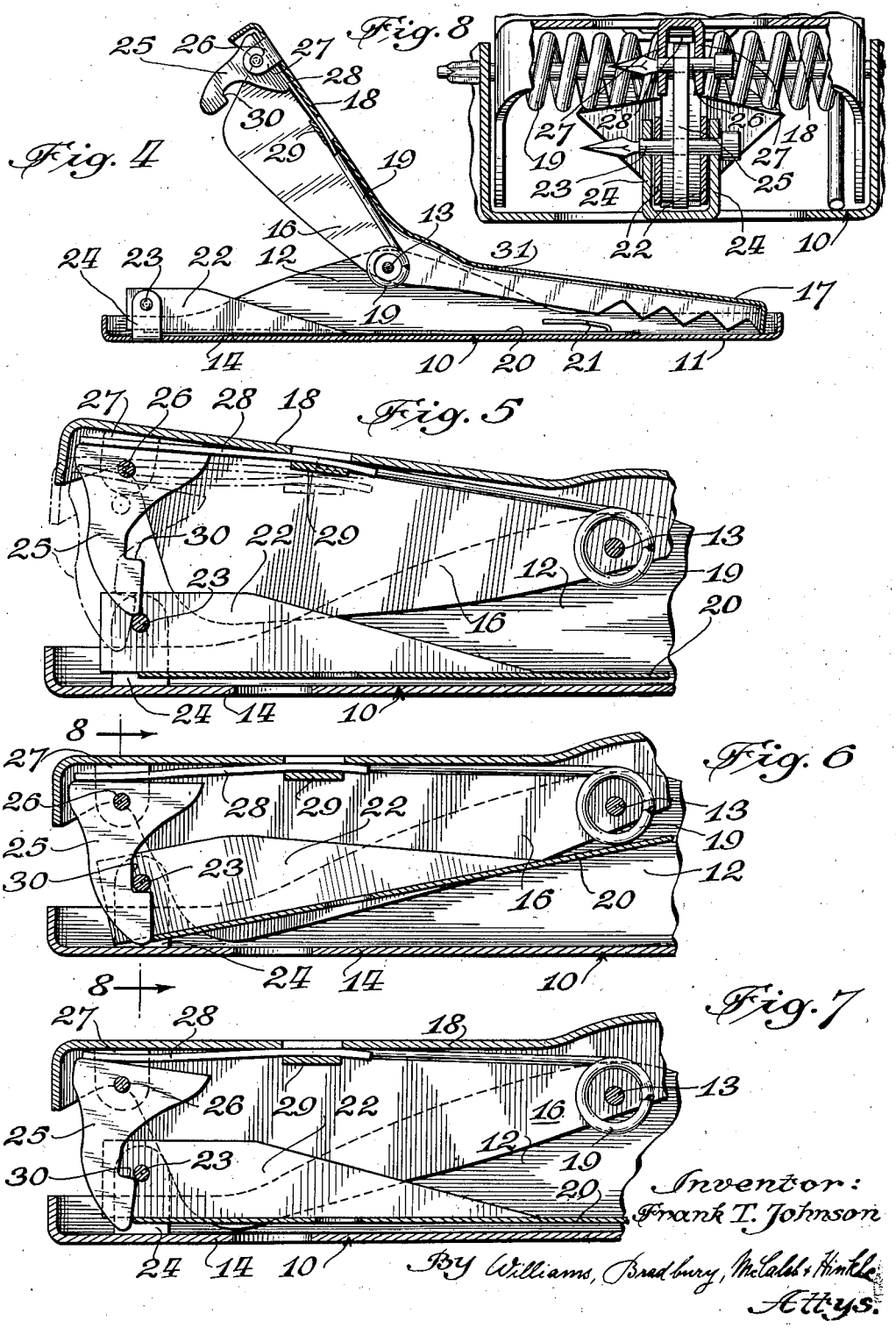

Patented Jan. 19, 1937

2,068,492

UNITED STATES PATENT OFFICE 2,068,492

ANIMAL TRAP

Frank T. Johnson, Elgin, Ill., assignor of one-half to Edgar C. Guthard, Chicago, Ill.

Application April 22, 1935, Serial No. 17,643

9 Claims. (Cl. 43—83)

This invention relates to animal traps and more particularly to traps intended for use in catching small animals such as rats.

The principal object of the invention is to provide an improved trap which can readily be set and which comprises an improved self-cocking trigger mechanism, whereby the trap may be readily and safely set by the use of one hand.

A further object of the invention is to provide a self-cocking trigger mechanism for the trap which enables the jaws of the trap to be latched directly to each other when in set condition, while at the same time preserving a high degree of sensitivity for unlatching by the bait holder.

A further object of the invention is to provide an improved bait holder for a trap of this type, which combines in an enhanced degree, the features of sensitivity and simplicity.

Other objects, advantages and capabilities of the invention will appear from the following description of a preferred embodiment thereof, taken in conjunction with the accompanying drawings, in which:

Figure 1 is a plan view of a trap embodying my invention in set condition;

Fig. 2 is a side elevation of the trap in set condition;

Fig. 3 is a front elevation of the trap in set condition;

Fig. 4 is a sectional elevation, taken on the line 4—4 of Fig. 1, showing the trap in snapped or closed condition;

Fig. 5 is a sectional detail view on a somewhat larger scale, taken on the line 5—5 of Fig. 1, showing the manner in which the trap becomes latched;

Fig. 6 is a similar view showing the trap in latched condition;

Fig. 7 is a similar view showing the latch at the point of release, and

Fig. 8 is a sectional detail view, taken on the line 8—8 of Fig. 6.

Referring to the drawings, the trap comprises a base 10, the forward part 11 of which serves as one of the jaws. The base 10 may suitably be fabricated from a piece of sheet metal, the edges of which are turned upwardly to impart strength and to increase the grip exercised by the jaw 11. At the intermediate position the upturned flange is increased to provide walls 12 which serve as supports for a pivot pin 13. As best seen in Fig. 1, the front part of the base 10, that is the jaw 11, is of substantial width, the portion of the base 10 behind the pivot 13 being preferably narrower. This narrow portion of the base 10 serves as a handle and is designated by the reference numeral 14.

The other principal element of the trap is designated as a whole by the reference numeral 15 and may suitably be constituted by a piece of sheet metal approximately the same size as the base 10 and having substantially the same initial outline. The element 15 is provided with a peripheral flange 16 which is turned downwardly and which fulfils a variety of functions, which will hereinafter be referred to. The element 15 is pivotally mounted on the base 10 by means of the pivot 13 which passes through openings in the flange 16. As best seen in Figs. 2 and 4, the element 15 is bent adjacent the pivot 13 so that it is able to swing on the pivot 13 through a substantial angle during the functioning of the trap. The forward portion of the element 15 constitutes a jaw 17 which is adapted to cooperate with the jaw 11 of the base, the entrapped animal being secured between these jaws. The portion of the element 15 rearward of the pivot 13 constitutes a handle 18. As will hereinafter be described the trap can be readily and easily set by merely engaging the handles 14 and 18 between the finger and thumb of one hand and pressing them together until the latch drops into place. The forward part of the flange 16, that is the part of the flange on the jaw 17, is preferably serrated, as indicated at 18, the better to secure the entrapped rodent.

A substantial coil spring 19, mounted on the pivot 13 and having ends bearing against the inner sides of the handles 18 and 14, tends to force the jaw 17 towards the jaw 11 when the latch is released.

The bait lever 20 may be provided with a hook formation 21 at its forward end for the purpose of securing the bait against accidental dislodgement. The hook formation 21 may suitably be stamped out of the relatively thin metal of which the bait lever 20 is preferably formed. As best seen in Fig. 4, the jaw 17 is provided with a large opening 31 immediately above the hook formation 21 so that bait may be applied to this formation readily and safely before the trap is set. The bait lever 20 extends rearwardly to nearly the end of the base 10. Adjacent its rear end its sides are turned upwardly to provide vertical flanges 22. The bait lever 20 is pivotally mounted near its rear extremity on a horizontal pin 23 which extends through the vertical flanges 22 and through lugs 24 which are struck up from the base 10. As best seen in Figs. 5, 6 and 7, the central or horizontal part of the bait lever 20 near its rear end, terminates somewhat forwardly of the flanges 22, for a purpose which will hereinafter be more fully described. It will be seen in Figs. 5 and 6 that the bait lever 20 has a relatively slight movement, being engaged by the base 10 in its lowermost position and by the spring 19 in its uppermost position.

The latching element 25 is pivotally mounted near the rear end of the handle 18 on a pin 26. The pin 26 extends through an opening in the latch 25 and through openings in lugs 27 struck down from the handle 18. The upper edge of the latch member 25 is relatively long and is engaged by a small leaf spring 28, which is held in position by a small strip 29 of the stock of the handle 18 which is struck down so as to form a loop through which the spring 28 can be passed.

The spring 28 extends between the lugs 27 and it is held against longitudinal movement by a suitable upward deformation of the strip 29, which may be effected by a blow applied to the underside of the strip 29. This blow deflects the spring 28 away from the under surface of the handle 18 so that it engages the flat upper surface of the latch 25 and biases the latch forwardly, as best seen in Fig. 5. The upward surface of the latch 25 is quite close to the under surface of the handle 18 so that its freedom of movement on the pivot 26 is relatively limited.

On its forward side the latch 25 is provided with a recess 30, the lower face of which is substantially horizontal in the latched condition shown in Fig. 6. The lower extremity of the latch member 25 is rounded and is so located that it engages the rear side of the pivot pin 23 when the handles 18 and 14 are moved together. This condition is shown in full lines in Fig. 5. As the handles 18 and 14 continue to approach, the latch 25 is deflected rearwardly against the force applied to it by the spring 28, this condition being shown in dot and dash lines in Fig. 5. With continued approach of the handles, the recess 30 is brought to a position so that the pin 23 may enter it, the entrance being accomplished by the forward movement of the latch 25 under the influence of the spring 28. The elements are so arranged that this forward movement causes the latch 25 to strike the rear extremity of the central portion of the bait lever 20, with the result that the forward end of the bait lever is moved upwardly, that is, from the position shown in Fig. 4 to the position shown in Fig. 2, or from the position shown in Fig. 5 to the position shown in Fig. 6.

It will be noted that the bait lever 20 is, in effect, a bell crank lever of very considerable mechanical advantage. When the forward extremity of the bait lever 20 is moved downwardly, the rear portion of this element which makes contact with the latch 25 is moved rearwardly to a very slight extent. Thus, very slight pressure exerted by the animal on the forward end of the bait lever 20 exerts a very considerable force upon the latch member 25. With reference to Figs. 6 and 7, it will be seen that this movement of the bait lever 20 swings the latch member 25 rearwardly and enables the spring 19 to snap the jaws to closed position. Fig. 7 shows the bait lever 20 depressed by the animal and the latch member 25 is on the point of clearing the pivot pin 23. It is preferred to mount the pin 23 so that it is free to rotate in the lugs 24. As a consequence of this free mounting the pin 23 moves freely with the movement of latch 25, thus serving as a roller bearing and increasing the sensitivity of the trap.

The trap may be baited through the opening 31 before it is set and may be set by mere pressure applied upon the handles 14 and 18. This pressure may be exerted manually or the approach of the handles may be effected by the application of the foot upon the handle 18.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. An animal trap comprising a base, a jaw pivotally mounted thereon, a spring tending to move said jaw to snapped position, said jaw and base having rearward extensions serving as handles, a latch member pivotally mounted on one handle, means on the other handle adapted to engage said latch member to set the trap when the handles are caused to approach, and a bait member biased downwardly and arranged to be out of engagement with the latch when the trap is in catching position and to be engaged and elevated by said latch when same moves into trap setting position.

2. An animal trap comprising two major elements pivotally connected together, a spring tending to move one of said elements to animal catching position, a latch on one element adapted to cooperate with the other element to hold the trap set, and a bait lever mounted on last said element and having contacting engagement with said latching member only when the trap is in set condition, said bait lever being adapted, when animal actuated, positively to displace the latch to non-latching position.

3. An animal trap comprising two major elements pivotally connected together, a spring tending to move one of said elements relatively to the other to animal catching position, a latch pivotally mounted on one element biased towards locking position, means on the other element adapted to be engaged by said latch to hold the trap set, and a relatively long bait lever pivotally mounted on one of said elements and having a contact portion displaced vertically from the lever pivot, said contact portion being in contacting engagement with the latch when the trap is in set position and out of engagement with the latch when the trap is in catching position, said bait lever being adapted, when animal actuated, positively to displace the latch to non-latching position.

4. An animal trap comprising a base, a jaw pivotally mounted on said base at an intermediate position thereof, a handle rigid with said jaw overhanging the rear portion of said base, latching means on the base, a latch depending from said handle adapted to engage the aforesaid means on said base to hold the trap set, and a bait lever pivotally mounted on said base and having contacting engagement with said latch when the trap is set, said bait lever being adapted, when animal actuated, positively to displace the latch to non-latching position.

5. An animal trap comprising a base, a jaw pivotally mounted on said base at an intermediate position thereof, a handle rigid with said jaw overhanging the rear portion of said base, resilient means biasing said jaw towards animal catching position, a latch depending from said handle, means on said base for engaging said latch, over which said latch slips when the handle is moved towards the base, resilient means tending to move said latch to latching engagement therewith, and a long bait lever pivotally mounted on said base and having contacting engagement with said latch when the trap is set, said bait lever being adapted, when animal actuated, positively to displace the latch to non-latching position.

6. An animal trap comprising two major elements pivotally connected together, a bait lever, a pivot pin mounted for free rotation on one element and pivotally mounting said bait lever thereon, and a latch on the other element adapted to engage said free pivot pin to hold the trap set and adapted to make operative contact with said bait lever.

7. An animal trap comprising a base of sheet metal having an upwardly turned peripheral flange, a jaw and handle element of corresponding outline formed of sheet metal and having a downwardly turned flange, said element being bent at an intermediate transverse position, a pivot extending through the flanges pivotally mounting the element on the base, a coil spring mounted on said pivot having ends in engagement with the base and element biasing the jaw strongly towards the base, a relatively long bait lever having upturned longitudinal flanges near its rear end which project beyond the central portion, a pivot for said lever extending through said flanges, lugs struck up from said base supporting the last said pivot, a latch pivotally mounted upon the depending from the rear or handle portion of the combined jaw and handle element, and a spring biasing said latch towards the pivot of the bait lever, said latch being formed so that it slips past said pivot when the handle portion is moved towards the base, the latch spring forcing the latch into latching engagement therewith and causing the latch to engage said central portion of the bait lever and raise said lever into a position from which it may be depressed by an animal to release the latch, the distance between the bait lever pivot and said central portion being relatively small to provide a substantial leverage.

8. In an animal trap, a base, a jaw disposed over one end of the base, means whereby the jaw is pivoted to the base intermediate the ends of the latter, resilient means whereby the jaw is biased toward animal catching position, a handle carried by the jaw and disposed over the other end of the base, a spring pressed latch depending from the handle, a pin carried by the base and arranged to cooperate with said latch when the handle is moved toward the base, and a bait lever having one of its ends pivoted by said pin, the other end of the bait lever being freely disposed between the jaw and the base, said latch and said bait lever having cooperating portions so arranged and coacting that the free end of the bait lever is elevated by the spring pressed latch when the latter is held by said pin, and the latch is released from said pin by the bait lever when the free end of the bait lever is depressed.

9. In an animal trap, a base, a jaw disposed over one end of the base, means whereby the jaw is pivoted to the base intermediate the ends of the latter, resilient means whereby the jaw is biased toward animal catching position, a handle carried by the jaw and disposed over the other end of the base, a spring pressed latch depending from the handle, latch engaging means carried by the base and arranged to cooperate with said latch when the handle is moved toward the base, and a bait lever having one of its ends pivoted to the base for movement on an axis which is closely adjacent to the position occupied by said latch when the latter is in operative engagement with said latch engaging means, the other end of the bait lever being freely disposed between the jaw and the base, said latch and said bait lever having cooperating portions so arranged and coacting that the free end of the bait lever is elevated by the spring pressed latch when the latter is held by said latch engaging means, and the latch is released from said latch engaging means by the bait lever when the free end of the bait lever is depressed.

FRANK T. JOHNSON.